Patented May 2, 1933

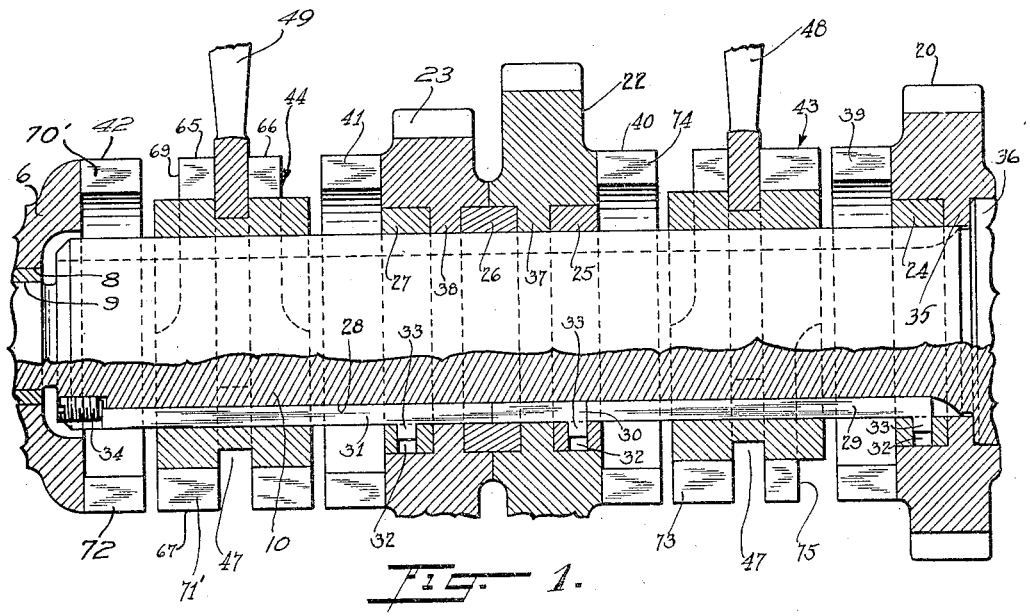

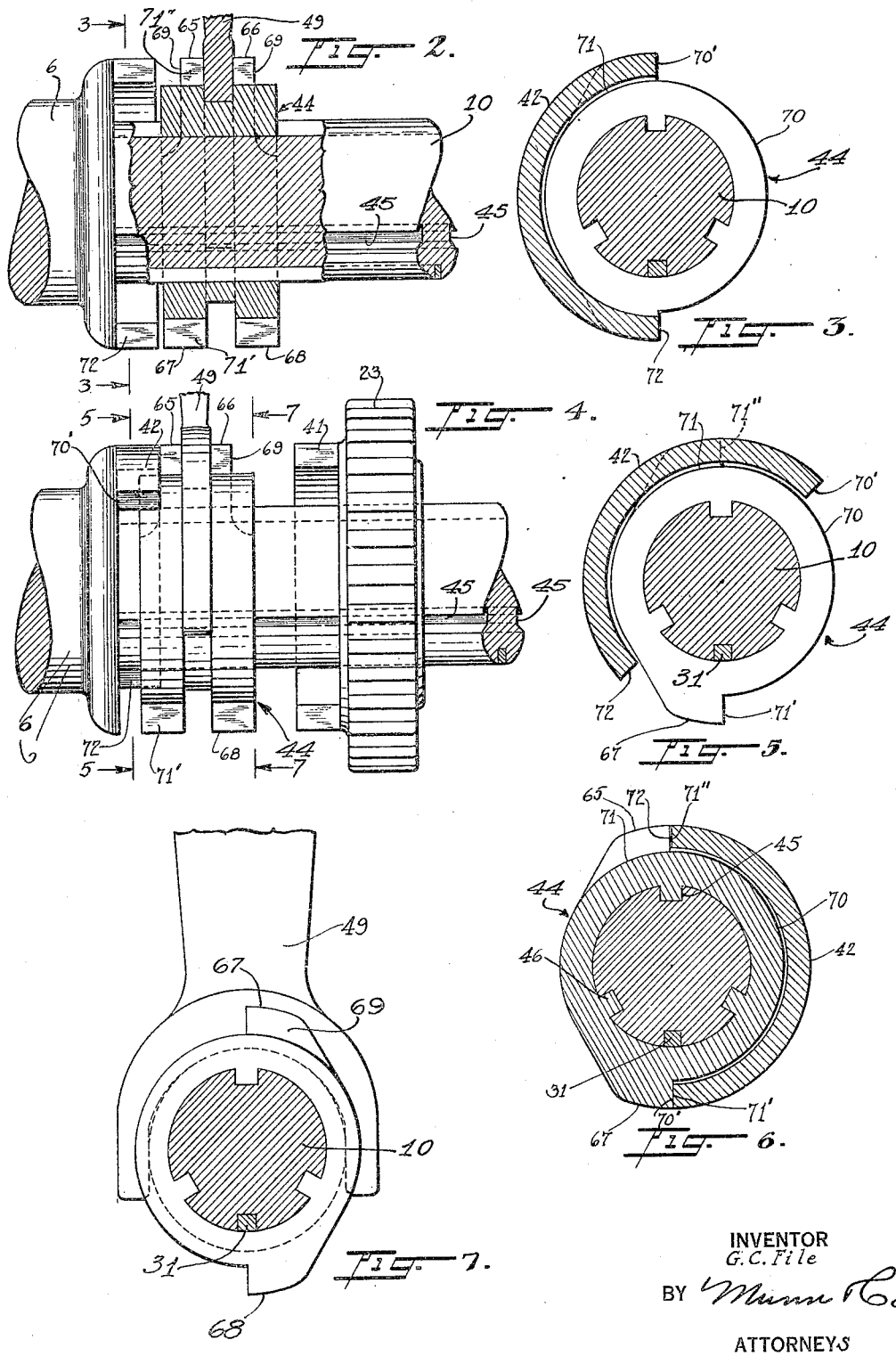

1,906,926

UNITED STATES PATENT OFFICE

GORDON C. FILE, OF BUCHANAN, MICHIGAN

CLUTCH MECHANISM

Application filed October 19, 1929. Serial No. 400,911.

My invention relates to improvements in clutch mechanisms, and it consists in the combinations, constructions, and arrangements herein described and claimed.

An object of my invention is to provide a clutch mechanism for vehicles in which the various gears of a transmission may be disposed in mesh at all times, thereby eliminating the necessity for shifting one gear into mesh with another gear, as when changing the speed of the vehicle.

A further object is to provide a clutch mechanism in which novel means is provided whereby the driver of the vehicle may shift the transmission mechanism to any desired speed, regardless of the speed of the vehicle or the speed of the motor.

A further object is to provide a clutch mechanism of a type in which the danger of stripping gears in a transmission is entirely eliminated and in which the speed-changing mechanism may be actuated in a minimum amount of time.

A further object is to provide a clutch mechanism in which novel means is provided whereby the various speed changes may be made in a transmission positively, silently, and with no clashing.

Other objects and advantages will appear in the following specification, and the novel features of the invention will be particularly pointed out in the appended claims.

My invention is illustrated in the accompanying drawings, forming part of this application, in which Figure 1 is an enlarged detail view of a transmission shaft and the clutch mechanism associated therewith, Figure 2 is an enlarged sectional detail view of the clutch members which are associated with the transmission shaft, Figure 3 is a sectional detail view taken along the line 3—3 of Figure 2, Figure 4 is an elevation of the structure shown in Figure 2, Figure 5 is a sectional view taken along the line 5—5 of Figure 4, Figure 6 is a sectional detail view showing the action of the clutch mechanism, and Figure 7 is a detail view of one of the shift forks, taken along the line 7—7 of Figure 4.

In carrying out my invention, I make use of an end of a power shaft 6 which is provided with an opening 8 within which a bearing 9 is disposed for receiving one end of a main drive or rotatable shaft 10. The opposite end of the latter is operatively connected with a propeller shaft of a vehicle. The propeller shaft and its associated mechanism are of course well known in the art and therefore require no detailed description.

In referring to Figure 1, it will be noted that I have mounted a plurality of collars 24 to 27, inclusive, upon the main drive shaft 10. The main drive shaft is provided with a keyway 28 for receiving a plurality of keys 29, 30, and 31. The outer edges of the keys 29 to 31, inclusive, are disposed in alignment with the circumference of the main drive shaft. The collars 24 to 27, inclusive, are provided with openings 32 for receiving projecting members 33 which are associated with the keys 29 to 31, inclusive.

In Figure 1 I have shown the ends of the keys as being disposed in engagement with each other and rigidly locked in position by means of a screw or bolt 34. It will be seen in referring to Figure 1 that a gear element 20 is provided with an internal flange which bears against a shoulder upon the main drive shaft. For this reason it will be seen that the collar 24 will be supported in operative relation with respect to the flange when the bolt 34 is properly adjusted. The collars 24 to 27, inclusive, and the keys 29 to 31, inclusive, are assembled together upon the main drive shaft 10. The collars are supported against longitudinal movement with respect to the main drive shaft and are also held against rotation upon the shaft by means of the keys. This construction is relatively simple and a construction which is easily assembled and firmly fixed upon the main drive shaft.

Gear elements 22 and 23 are provided with internal flanges 37 and 38, respectively. The latter are disposed between the collars 25, 26 and 27. The gears 20, 22, and 23 are arranged for rotation upon the collars 24 to 27, inclusive. The collars, however, hold the gears against longitudinal movements with respect to the main drive shaft. The gears 20, 22, and 23 are provided with arcuate shaped flange portions 39, 40, and 41, respectively. The power shaft 6 is also provided with a similar arcuate shaped flange 42. The flanges are disposed concentrically with respect to the main drive shaft and extend through an arc of substantially 180°, their terminations providing shoulders.

A pair of clutch members or elements 43 and 44 is mounted upon the main drive shaft 10. The drive shaft is provided with keyways 45 for receiving keys 46 associated with each of the clutch members. The latter are arranged for movement longitudinally upon the main drive shaft. In Figure 1 I have shown each clutch member as being provided with a groove 47 arranged to receive end portions of shift forks 48 and 49. The shift fork 48 is associated with the reverse and first speed gears, and the shift fork 49 is associated with the second and high speed gears.

The clutch members 43 and 44 are substantially identical in construction. The operation of each is identical. The description of one of the clutch members in detail will suffice for both units.

From the foregoing description of the various parts of the device, the operation thereof may be readily understood. Consider the clutch member 44. Figure 2 shows the clutch member 44 in its neutral position. The clutch member is provided with radially extending projecting portions 65 and 66 upon one side and radially extending projecting portions 67 and 68 upon the opposite side. The portions 65 and 66 are substantially diametrically opposite the portions 67 and 68. The portions 65 and 66 are cut away as at 69. The cutaway portion conforms to the cylindrical portion 70 of the clutch member, see Figure 3, as at 71. The outer sides of the portions 67 and 68 are flush with the ends of the body portion of the clutch member.

It will be seen in referring to Figure 3 that when the clutch member is in the position shown, the face of the portion 67 adjacent the flange 42 bears against the latter when the clutch member is moved in the direction of the flange. When, however, the power shaft 6 moves sufficiently far to bring the flange to the position shown in Figure 5, the clutch member will be moved for bringing the outer end face of the portion 65 into engagement with the flange 42.

Continued rotation of the flange 42 will move the face 70′ into engagement with the face 71′ associated with the portion 67, see Figure 6. At this time the clutch member may be moved in the direction of the flange 42, at which time the entire face 70′ will be disposed in engagement with the entire face area 71′.

In referring to Figure 6, it will be noted that the portion 65 is provided with a face 71″ which substantially engages a face 72 associated with the flange 42. It will thus be seen that the clutch member 44 is rigidly locked into engagement with the power shaft 6. When the face 70′ first engages the face 71′, the clutch member may be said to be in semi-engagement with the flange 42. When, however, the flange 42 is moved to the position shown in Figure 6 with respect to the portions 65 and 67, a slight movement of the control lever will move the clutch member into full engagement with the flange 42. The clutch member may be easily moved by reason of the fact that the face 71′ moves parallel with the face 70′.

It will be noted that each clutch member comprises two units. One end of the clutch member 44 is arranged to be moved into operative engagement with the flange 42 associated with the power shaft and the opposite end of the clutch member is arranged to be moved into engagement with the flange 41 associated with the gear 23. The clutch member 43 may be moved in the direction of the gear 22 for bringing the face 73 into engagement with the face 74 associated with the flange 40. A reverse movement of the clutch member brings the opposite end of the same into operative engagement with the flange 39 associated with the gear 20. It will be noted in referring to the clutch member 43 that the cutaway portion 75 is oppositely disposed with respect to the cutaway portions associated with the clutch member 44. This is necessary by reason of the fact that one end of the clutch member engages the reverse speed gear 20. In view of the fact that the control lever is well known in the art, no description of the latter is necessary.

It will be noted that I have provided a clutch mechanism adapted for use in a transmission in which all gears may be in mesh at all times. I have eliminated entirely the necessity for moving one gear into engagement with an associate gear for changing the speed of the vehicle. The clutch members are relatively strong and will therefore permit the shifting of the vehicle into various speeds, regardless of the speed of the motor or the vehicle, with no danger of stripping any of the gears.

I claim:

1. The combination with a rotatable shaft of a clutch mechanism comprising a primary element and a complementary element, one of said elements being rotatable with respect to the shaft, the other of said elements being non-rotatably mounted on the shaft, an arcuate-shaped flange portion connected with one of said elements and terminating in shoulder portions, radially extending peripheral flange portions connected with the other of said elements and terminating in shoulder portions, and means for moving one of said elements whereby the shoulder portions thereof may be moved into engagement with the shoulder portions of the other element.

2. The combination with a rotatable shaft of a clutch mechanism comprising a primary element and a complementary element, one of said elements being rotatable with respect to the shaft, the other of said elements being non-rotatably mounted on the shaft, an arcuate-shaped flange portion connected with one of said elements and disposed concentric and in spaced-apart position with respect to said shaft, said flange portion terminating in shoulder portions oppositely disposed with respect to each other, a pair of radially extending peripheral flange portions connected with the other of said elements and terminating in shoulder portions oppositely disposed with respect to each other, and means for moving one of said elements whereby the shoulder portions thereof may be moved into engagement with the shoulder portions of the other element.

3. The combination with a rotatable shaft of a clutch mechanism comprising a primary element and a complementary element, one of said elements being rotatable with respect to the shaft, the other of said elements being non-rotatably mounted on the shaft, an arcuate-shaped flange portion connected with one of said elements and disposed concentric and in spaced-apart position with respect to said shaft, said flange portion terminating in shoulder portions oppositely disposed with respect to each other, a pair of radially extending peripheral flange portions connected with the other of said elements and terminating in shoulder portions oppositely disposed with respect to each other, and means for moving one of said elements whereby the shoulder portions thereof may be moved into engagement with the shoulder portions of the other element, one of said peripheral flange portions being adapted for positioning the other of said peripheral flange portions in overlaping relationship with respect to the arcuate-shaped flange portion whereby the shoulder portions thereof may be positioned for engagement.

4. The combination with a rotatable shaft of a clutch mechanism comprising a primary element and a complementary element, one of said elements being rotatable with respect to the shaft, the other of said elements being non-rotatably mounted on the shaft, an arcuate-shaped flange portion connected with one of said elements and disposed concentric and in spaced-apart position with respect to said shaft, said flange portion terminating in shoulder portions oppositely disposed with respect to each other, a pair of radially extending peripheral flange portions connected with the other of said elements and terminating in shoulder portions oppositely disposed with respect to each other, and means for moving one of said elements whereby the shoulder portions thereof may be moved into engagement with the shoulder portions of the other element, one of said peripheral flange portions being adapted for positioning the other of said peripheral flange portions in overlaping relationship with respect to the arcuate-shaped flange portion whereby the shoulder portions thereof may be positioned for engagement, said first-named peripheral flange portion being adapted for subsequently moving into locking engagement with the arcuate-shaped flange portion.

Signed at city of Niles, in the county of Berrien and State of Michigan this 10th day of October A. D. 1929.

GORDON C. FILE.